United States Patent [19]
Schmidt et al.

[11] Patent Number: 5,373,505
[45] Date of Patent: Dec. 13, 1994

[54] SWITCHING NETWORK FOR DIGITAL SWITCHING SYSTEMS COMPOSED OF SWITCHING MATRICES CONNECTED PARALLEL AT THE INPUT SIDE

[75] Inventors: Lothar Schmidt, Fuerstenfeldbruck; Juergen Storm, Puchheim, both of Germany

[73] Assignee: Siemens Aktiengesellschaft, Munich, Germany

[21] Appl. No.: 82,495

[22] Filed: Jun. 28, 1993

[30] Foreign Application Priority Data

Jul. 14, 1992 [EP] European Pat. Off. ......... 92111996.2

[51] Int. Cl.$^5$ .............................................. H04Q 11/08
[52] U.S. Cl. ...................................... 370/66; 370/58.1
[58] Field of Search ................. 370/66, 58.1, 60, 67, 370/53, 68, 58.2

[56] References Cited
U.S. PATENT DOCUMENTS

4,471,479 9/1984 Wass ...................................... 370/66

FOREIGN PATENT DOCUMENTS

61-116496 6/1986 Japan.
04393 10/1986 Japan ..................................... 370/66

*Primary Examiner*—Douglas W. Olms
*Assistant Examiner*—Huy D. Vu
*Attorney, Agent, or Firm*—Hill, Steadman & Simpson

[57] ABSTRACT

Switching network for digital switching systems composed of switching matrices connected parallel at the input side wherein the switching matrices contain a frame memory (R1 through Rm) per input for the acceptance of the supplied information that is cyclically written in and randomly read out. The write-in into the frame memories (R1 through Rm) is controlled by auxiliary information in the holding memories (H) supplying the read-out addresses such that the write-in respectively ensues only into that frame memory from which read-out is to be carried out on the basis of the switching network output that is to be selected. This results in lower dissipated power.

3 Claims, 3 Drawing Sheets

SWITCHING NETWORK FOR DIGITAL SWITCHING SYSTEMS COMPOSED OF SWITCHING MATRICES CONNECTED PARALLEL AT THE INPUT SIDE

BACKGROUND OF THE INVENTION

The present invention is directed to a switching network for digital switching systems composed of switching matrices having their respective inputs connected parallel.

Such a switching network or a partial switching network can, as FIG. 1 also shows, be composed of switching matrices having m inputs and at least one output or a plurality of outputs that is lower in comparison to the plurality of inputs. Inputs of the same standing in these switching matrices are connected to one another. The plurality of switching matrices connected to one another is dependent on how many outputs the switching network or partial switching network has. In the case of a quadratic arrangement having m inputs and m outputs and switching matrices having only one output as illustrated in FIG. 1, m such switching matrices are connected parallel.

FIG. 2 shows an example of a switching network or a partial switching network having m inputs and outputs, whereby the plurality of inputs of a switching matrix is less than m. Given the assumption of e inputs per switching matrix, m/e groups of arrangements according to FIG. 1 are provided in this case, their outputs of the same standing being respectively combined by one of m multiplexers MUX1 through MUXm to form m overall outputs.

A plurality of such partial switching networks according to FIG. 1 or FIG. 2 are connected to one another via one or more space switching stages for constructing even larger switching networks.

FIG. 3 shows the internal structure of a switching matrix of a type employed in the arrangement of FIG. 1. The illustrated unit has m inputs E1 through Em and, correspondingly, m frame memories R1 through Rm that are connected to the inputs by serial-to-parallel converters S/P1 through S/Pm. Given the assumption of pulse frames having n channels, the frame memories have n memory locations for respectively one PCM (pulse code modulated) word.

The write-in into the frame memories occurs cyclically, to which end a counter Z supplies n write-in control addresses as well as a write enable signal W to respective memory cells of the same order of all frame memories via a decoder D1. The read-out from the frame memories occurs randomly, to which end a holding memory H that is also cyclically driven by a counter Z via a decoder D2 supplies read-out control addresses. The read-out control addresses have two parts together with a read instruction signal R, namely a partial address AP that identifies memory locations within the frame memories and a partial address AR that identifies the individual frame memories. The memory location partial addresses AP likewise simultaneously proceed via the decoder D1 to memory locations of the same rank in all frame memories, by contrast whereto the memory block partial address AR proceeds via a decoder D3 for the drive of respectively one of the frame memories to a corresponding read enable input thereof.

The aforementioned counter Z supplies 2 n drive addresses for n channels during the duration of a pulse frame, these drive addresses being accompanied in alternation by the write-in instruction signal W and the read instruction signal R. An AND operation of the write-in instruction signals with the drive addresses accompanying them by an AND element K leads to the forwarding of these addresses via the aforementioned decoder D1 to the frame memories as write-in control addresses. Negation of the read instruction signals R by a negator N and subsequent AND operation with the read control partial address AR supplied from the holding memory, likewise by the AND element K, leads, as an alternative thereto, to the forwarding of these read control partial addresses to the individual memory cells of all frame memories, also via the decoder D1. The write-in instruction signal W acts as an enable signal for input circuits I1 through I3 via which information coming from the serial-to-parallel converters can proceed into the frame memories. The negated read instruction signal R also acts as an enable signal for the decoder D3 via which the second partial addresses AR proceed to the frame memories and, thus, enable the acceptance of information from respectively one of the frame memories at a parallel-to-serial converter P/S of the output side.

The events in time channel conversions with the described switching matrix shall be briefly set forth below.

Equivalent time channels of the input time-division multiplex lines connected to the inputs E1, E2 and Em are thereby considered, these having a time slot u and being referenced a in the case of the first input multiplex line, b in the case of the second input multiplex line and c in the case of the input multiplex line m. The channel a should be converted onto a channel y, and the channel b should be converted onto a channel z, and the channel c should be converted onto a channel x on the output multiplex line. Consequently, the respective addresses of the time slots u are entered as the first drive partial addresses AD in the memory locations of the holding memory H that correspond to the time channels x, y and z. The address of the memory m resides in the memory location corresponding to the time channel x as second partial address AR, the address of the memory 1 resides in the memory location corresponding to the time channel y, and the address of the memory 2 resides in the memory location corresponding to the time channel x.

The operations are then such that the contents of the channels a, b and c, according to their time slots u, are entered into the memory locations 1-u, 2-u and m-u of the frame memories 1, 2 and m that are allocated to these time slots, being entered therein during the course of the cyclical write-in. As a result of the random read drive of the frame memory 1 during the time slot y, of the frame memory 2 during the time slot z, and of the frame memory m during the time slot x, respectively with the memory location address u, the desired time channel conversion occurs. Thus, the time channel sequence c, a, b is provided on the output multiplex line with respect to the time channel a, b and c, as indicated in FIG. 3.

In the case of a switching matrix having, for example, two outputs, the holding memory would have to be read out twice per time slot for supplying the read control addresses for the frame memories, whereby the first read event supplies the information for the first output and the second read event supplies the information for the second output.

When, for forming a switching network, a plurality of switching matrices according, for example, to FIG. 2 are connected parallel at their input side, as shown, for example, in FIG. 1, then a write-in of the channel information a, b and c into the frame memories of all switching matrices ensues, even though a read-out in the assumed example only ensues from the frame memory of that switching matrix to which the appertaining output multiplex line is connected.

A fashioning of the switching network of LSI modules is of interest in view of achieving a cost-beneficial and space-saving structure of a switching network. An optimally great plurality of inputs and outputs is thereby desired, whereby, however, limits are established by the dissipated power of the module.

SUMMARY OF THE INVENTION

It is an object of the present invention to provide a switching network design with which the dissipated power of such modules can be reduced, thus, allowing greater numbers of connections per module.

This object is inventively achieved by a switching network for digital switching systems composed of at least one group of switching matrices connected in parallel at the input side. Each switching matrix has m inputs and a plurality of outputs that is small in comparison to the number of inputs. Each switching matrix has frame memories provided per input and has a memory capacity for the information of a pulse frame into which writing is carried out from the multiplex lines connected to the inputs upon cyclical addressing of their memory locations and from which reading is randomly carried out onto the multiplex lines connected to the outputs on the basis of the drive by a shared holding memory. The holding memory respectively supplies decision bits that are individually associated to inputs together with the drive addresses for the frame memories. These decision bits determine whether the cyclically supplied write-in addresses are effective or not for the individual frame memories and are set such that an information entry into a frame memory only occurs when the appertaining information is also to be read out in turn from this frame memory.

Using a relatively low control and hardware outlay, what the design of the present invention achieves is that the write-in of PCM words always occurs only in the frame memory of those switching matrices to whose output multiplex lines connected thereto a through-connection is to ensue. The power that was required in the above-described, known switching network design for the additional write-in into the frame memories of all other switching matrices is thus saved.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

Figure 3:
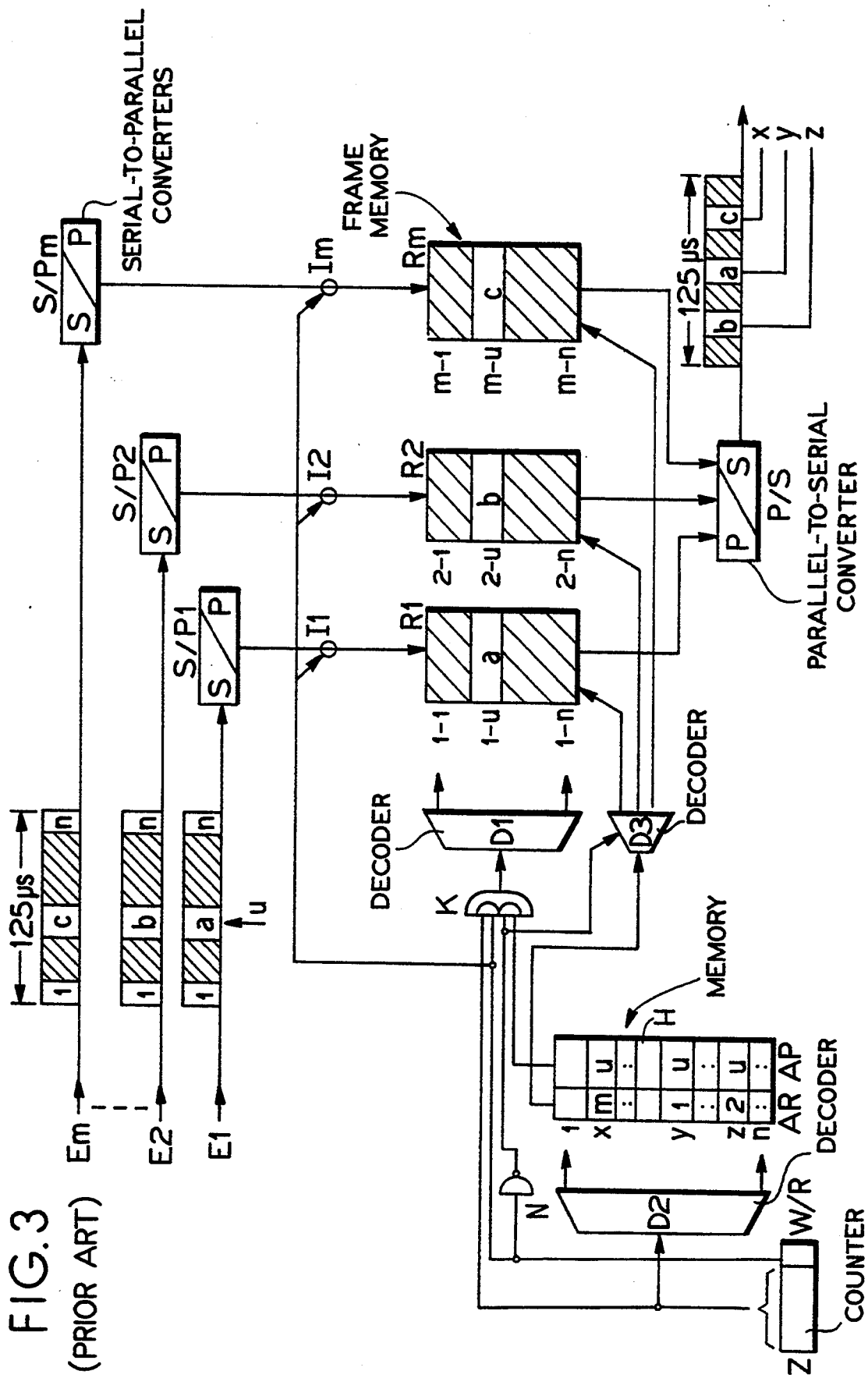
Figure 4:
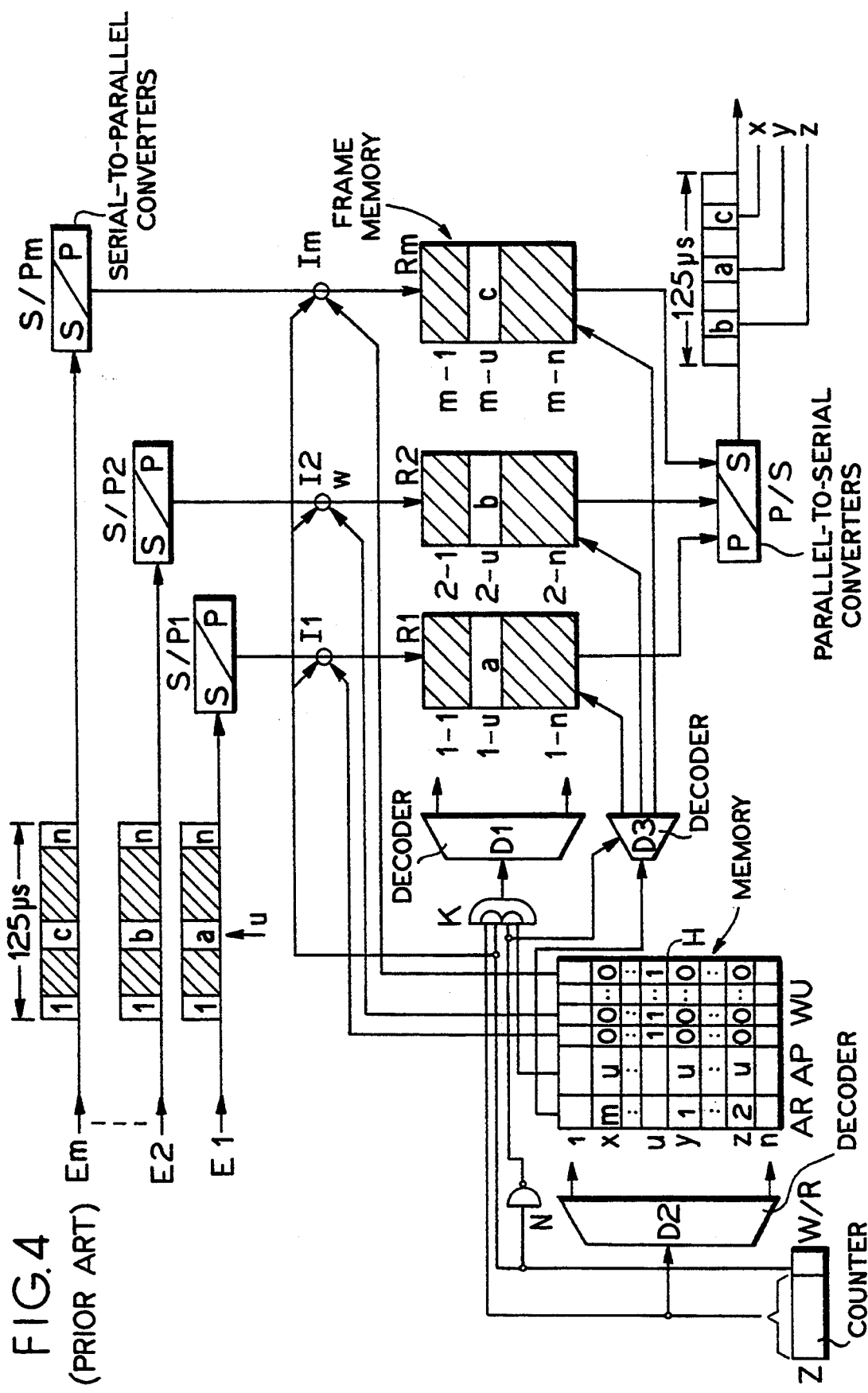
FIG. 4 depicts an inventively designed switching network unit derived from FIG. 3.

The switching matrix according to FIG. 4, wherein identical parts are referenced with the same reference characters as in the switching matrix of FIG. 3, differs from the switching matrix of FIG. 3 essentially on the basis of an expansion of the holding memory H by a memory space in which write-in transfer bits WU are stored individually associated to frame memory as a supplement to the subscriber addresses AR and AD. These write-in transfer bits are operated with the aforementioned write instruction bits W supplied by the counter Z to form a drive signal for the input circuits I1 through Im via which the information coming from the input multiplex lines proceeds to the frame memories R1 through Rm.

According to the assumed example that the time channels of the time slot u on the input time-division multiplex lines connected to the inputs El, E2 and Em are to be written into the corresponding frame memories, i.e. R1, R2 and Rm, of the switching matrix under consideration, the holding memory contains the entry of a binary one bit at the positions corresponding to the inputs El, E2 and Em in the memory location corresponding to the time slot u. The other write acceptance bits of this memory location u have the binary value zero.

Figure 1:
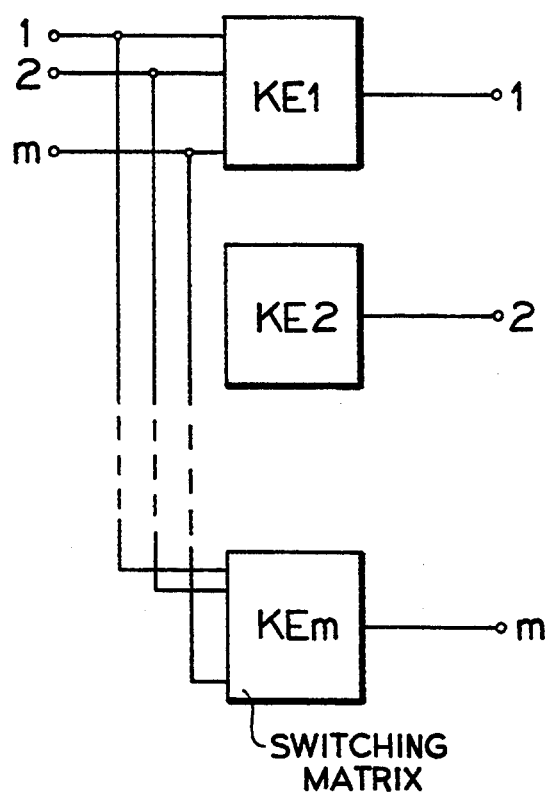
FIGS. 1, 2 and 3 (already discussed) depict a prior art switching network or a switching network unit of the type at which the present invention begins.
Figure 2:
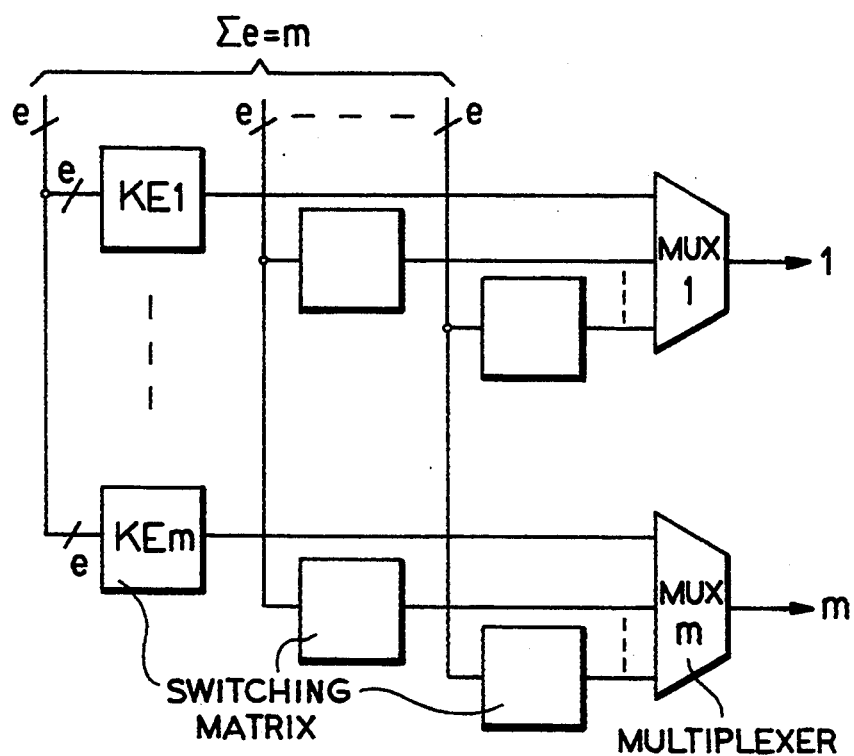

Entries of zero bits are located at the positions of the write acceptance bits for the inputs El, E2 and Em in the memory location u in all other switching matrices that, according to the illustration in FIG. 1, form the switching network. It is assured in this way that, as desired, the time channel contents of the time channels having the time slot u that are supplied on the input multiplex lines connected to the inputs El, E2 and Em, i.e. the time channels a, b and c, are only written into the frame memories R1, R2 and Rm of that switching matrix whose input circuits are switched to be conducting, namely that switching matrix to whose output multiplex line these channels are to be switched in accord with the assumed example.

Given the employment of switching matrices having 16 inputs and 2 outputs, the plurality of write-in cycles per pulse frame at the individual frame memories of the 16 frame memories would respectively be reduced to $\frac{1}{8}$ as a consequence of the measure of the present invention, since overall no more information is written in per switching matrix than can be read out on 2 output lines, i.e. the information contents of two pulse frames overall.

Given n time channels per pulse frame, the overall number of read-write cycles of a switching matrix is reduced from $(16+2) \times n$ to $(2+2) \times n$, which corresponds to a reduction by a factor of 4.5 of the dissipated power for read-write cycles.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A switching network for digital switching systems composed of at least one group of switching matrices connected in parallel at an input side of the switching network, comprising: each of the switching matrices having a plurality of inputs and a plurality of outputs, a number of outputs being less than a number of inputs, input multiplex lines being connected to the inputs and output multiplex lines being connected to the outputs, having frame memories provided per input and having frame memory capacity for storing information of a pulse frame into which writing is carried out from the input multiplex lines connected to the inputs upon cyclical addressing of memory locations of the frame memories and from which reading is randomly carried out onto the output multiplex lines connected to the outputs on the basis of a drive by a shared holding memory, the holding memory having decision bits that are individually associated to said inputs together with drive addresses for the frame memories, the frame memories being connected to the inputs of the switching matrices by input circuits, the decision bits being determinative of whether cyclically supplied write-in addresses are effective or not for the individual frame memories by switching of respective input circuits of said frame memories into respective conducting and nonconducting states and being set such that an information entry into a respective frame memory only occurs when appertaining information is also to be read out in turn from a respective frame memory.

2. A switching network for digital switching systems composed of at least one group of switching matrices connected in parallel at an input side of the switching network, each of the switching matrices having a plurality of inputs and a plurality of outputs a number of the outputs being less than a number of the inputs, input multiplex lines being connected to the inputs and output multiplex lines being connected to the outputs, having a plurality of frame memories, a respective frame memory provided per respective input, and having a frame memory capacity for storing information of a pulse frame and into which writing is carried out from the input multiplex lines connected to the inputs upon cyclical addressing of memory locations of the frame memories and from which reading is randomly carried out onto the output multiplex lines connected to the outputs, comprising:

a holding memory containing decision bits and drive addresses for the frame memories, said holding memory operatively connected to said frame memories; and a plurality of input circuits, a respective input circuit connected between a respective input and a respective frame memory, and each of the input circuits receiving a respective decision bit from the holding memory;

wherein the holding memory respectively supplies decision bits that are individually associated to the inputs together with the drive addresses from the frame memories, said decision bits determining whether cyclically supplied write-in addresses are effective or not for writing to the frame memories by switching of respective input circuits of said frame memories into respective conducting and nonconducting states and being set such that an information entry into a respective frame memory only occurs when appertaining information is also to be read out from the respective frame memory.

3. A switching network for digital switching systems composed of at least one group of switching matrices connected in parallel at an input side of the switching network, comprising:

each of the switching matrices having a plurality of inputs and a plurality of outputs, a number of the outputs being less than a number of the inputs, input multiplex lines being connected to the inputs and output multiplex lines being connected to the outputs, and having a plurality of frame memories, a respective frame memory provided per respective input, and having a frame memory capacity for storing information of a pulse frame and into which writing is carried out from the input multiplex lines connected to the inputs upon cyclical addressing of memory locations of the frame memories and from which reading is randomly carried out onto the output multiplex lines connected to the outputs;

a holding memory containing decision bits and drive addresses for the frame memories, said holding memory operatively connected to said frame memories; and a plurality of input circuits, a respective input circuit connected between a respective input and a respective frame memory, and each of the input circuits receiving a respective decision bit from the holding memory;

wherein the holding memory respectively supplies decision bits that are individually associated to the inputs together with the drive addresses for the frame memories, said decision bits determining whether cyclically supplied write-in addresses are effective or not for writing information received on the inputs to the frame memories by switching of respective input circuits of said frame memories into respective conducting and nonconducting states and being set such that an information entry into a respective frame memory only occurs when appertaining information is also to be read out from the respective frame memory.

* * * * *